June 20, 1961    M. P. LAUGHLIN    2,988,849
MEANS FOR APPLYING PLANT GROWTH CONTROL CHEMICALS
Filed Oct. 5, 1956
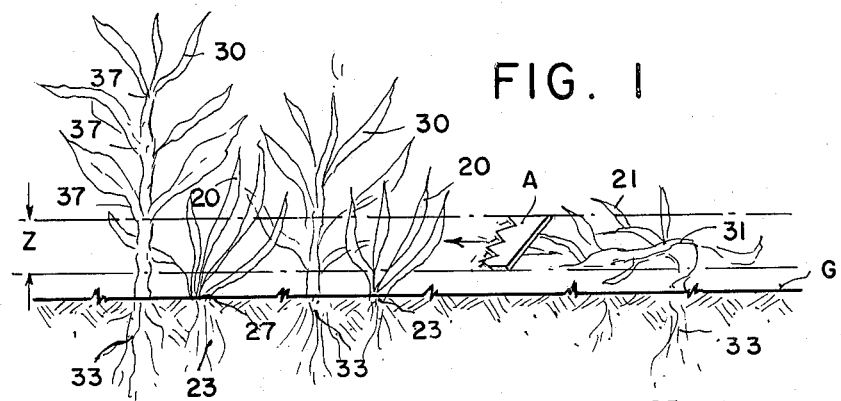
FIG. 1
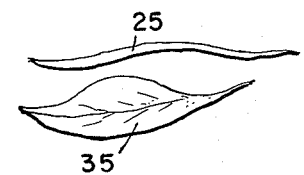
FIG. 2
FIG. 3
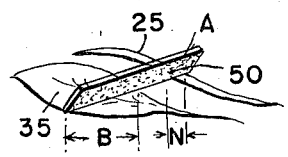
FIG. 4
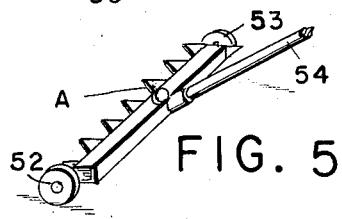
FIG. 5
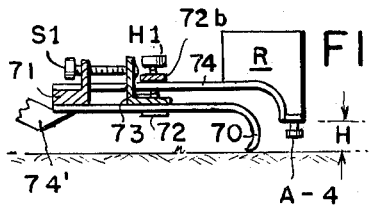
FIG. 6
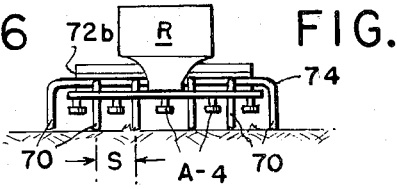
FIG. 7
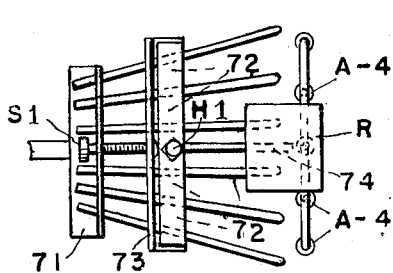
FIG. 8
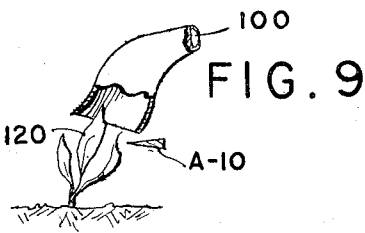
FIG. 9
INVENTOR.
Myron P. Laughlin

United States Patent Office 2,988,849
Patented June 20, 1961

2,988,849
MEANS FOR APPLYING PLANT GROWTH CONTROL CHEMICALS
Myron P. Laughlin, 1705 Beach Drive SE., St. Petersburg, Fla.
Filed Oct. 5, 1956, Ser. No. 614,315
6 Claims. (Cl. 47—1.5)

This invention relates to feeding chemicals to plants for growth control therein and more particularly to a process, and means for the implementing thereof, for supplementing so-called selective plant chemicals by physical selection of the plants and plant parts to be treated. Such chemicals are presently classified as arsenates (such as arsenic trioxide), phenoxy compounds (such as 2-4 dichlorophenoxyacetic acid and 2-4-5 trichlorophenoxypropionic acid and the like), substituted phenols, carbamates, substituted ureas, various cyanamides (such as calcium cyanamide) various salts (such as maleic hydrazide), nearly all of which have in larger doses, plant killing or retardant properties, but which in lesser accurately controlled doses, act as growth stimulants.

This invention relates most specifically to means and method for the accurately controlled application of such chemicals to plants and plant zones in preselected accurate doses.

Heretofore it has been usual to apply growth control substances to vegetation by spraying, sprinkling or sowing solutions and mixtures thereof on the whole plant area, methods which cover all plants in the area and the ground therebeneath as well as adjoining areas with unwanted and often destructive applications. Such methods have reduced desired concentrations on the special plants to be treated, and increased cost of chemicals while reducing results thereof and making accurate dosage of selected types impossible. The same methods make contamination of ground and surroundings unavoidable. Furthermore such broadcast methods have subjected areas far removed from treated areas to "drift," "vaporization," "translocation," "leaching" and "float" exposures, with expensive compensation measures thereof as unavoidable consequences.

The herein disclosed invention provides simple methods and means for chemically treating in mixed planting a pre-selected plant type and a selected part of such selected plants, while avoiding similar treatment of other plant types in the same plot. It also provides in the same means for effective, forceful application of chemicals in such fashion that pre-selected plants are internally inoculated and external losses therefrom by drop, drift, and vaporization reduced, while loss by possible leaching and float disappears.

This inventor is aware that it has been suggested that to avoid such difficulties, individual application of chemicals could be made by hand to each separate plant but time and cost of such hand treatment in any variegated growth area of even minimum plot size bars such methods, even if selective knowledge, skill and patience required were available. He is also aware that means for individual inoculation of trees and isolated growths by variations of the hypodermic needle devices have been patented. However the herein disclosed invention relates, not to such laborious manual individual selection and application, but to automatic treatment of whole areas containing mixed plant types through novel means, automatically treating pre-selected plant types with optimum effectiveness, while affecting the remainder with minimum result, eliminating side effects entirely.

It is a special purpose of this invention to supplement the inherent biochemical selectivity of fed chemicals by mechanical selectivity in feeding so that differential chemical action is supplemented by truly effective, direct delivery of the chemical substance to the specific plant at the most effective place thereon without dispersion and waste.

The appended drawings will serve to illustrate the working of my process and disclose simple embodiment structures usable therein and therewith.

FIGURE 1 is a diagrammatic elevation of a plant area within which my process is in operation.

FIGS. 2 and 3 serve to illustrate and differentiate between certain leaf types described.

FIG. 4 discloses a method of breaking surface tension in the treated plants,

FIG. 5 shows a simple mechanical device usable in connection with my process,

FIG. 6 is a side elevation in section of another modified garden device having means to put my invention into practice, FIG. 7 is an end view of the FIG. 6 device, FIG. 8 is a top detail view of adjustment means for the devices of FIG. 7.

FIG. 9 shows another modification of means whereby my invention may be practiced.

Referring now particularly to FIGS. 1-2-3; the ground level of the plant area is indicated at "G" and upon this level are plants such as grasses 20—21 and stalk plants 30—31 having root structures 23 and 33 respectively. Grasses 20—21 have narrow leaf structures 25 while plants 30—31 have broader leaves 35. Both have the function of feeding the whole plant through growing areas or crowns 27 and 37 and take in food through their surfaces, passing it on to their root systems 23 and 33.

The surfaces of such leaves are often coated with plant secretions and hairy growths holding dust and the like so that their absorbtive powers may be slow. To break this surface layer and surface tension, I apply an applicator "A" drawn over the leaf surface with some force, preferably at a slight angle to the direction of motion as shown. FIG. 4 serves to show such an applicator and dimensions B and N illustrate the wider contact had by such with the plant 30, leaves 35 and the lesser contact with grasses 20 and leaves 25. It will be understood that applicator "A" may include a suitable reservoir within itself, such as pad 50.

It will also be clear that for a given distance moved by applicator "A," it will scrape, prepare and treat a much greater area of the broader leaf than for the narrow leaf and if applicator "A" supports a pad 50 carrying a growth control chemical, it will be equally obvious that a much greater amount of such chemical will be applied with greater efficiency to leaf 35 than to leaf 25. Thus, taken alone, the means disclosed not only conditions the leaves for the applicator of a chemical by cleaning the leaves and breaking the surface tension thereof, and thereupon applies the chemical, but also acts selectively in itself to apply more of a given chemical to the broader leaves, thus multiplying the selective action of certain inherently selective chemicals and making non-selective compounds selective by virtue of controlling the amounts supplied. Thus, where previously the chemical substance above had to be adjusted to promote or retard plant growth for a particular species, I now provide mechanically selective means which may be arranged to selectively apply such chemicals, selection being accomplished both through physical differences in the plant structures and through the place or zone on such structures where application is made.

It will be understood that while I have shown here for simplified description certain forms of applicator, the applicator used may be of any of the well known types, such as brushes and the like supplied by suitable reservoirs or hoppers, all within the scope of my invention and the spirit of the appended claims.

It has been found that hormones and herbicides applied to growing plants above the growth crown thereof have usually greater effects on the foliage and lesser effects on root systems and general growth, while application below such crowns will directly feed the root systems and affect the same very quickly and often drastically; thus control of place of chemical application to the plant is most important and such control is an important part of this invention. This control is of especial importance when chemicals intended to destroy weed plants and encourage grass types are to be applied and especially effective with the herein disclosed means as applied to weed killing since by this means practical avoidance of any substantial effective application to the grasses may be had as grass crowns lie at, or very little raised above, ground level while weed plants commonly grow rank and with relatively high crowns.

Such means will also be seen to increase the efficiency of actual application since the chemicals need no longer be sprayed or sown broadcast but are now literally "placed" on the plant; an action made further effective if the applicator is traversed rapidly across the area (as in FIG. 1) at a pre-selected height, speed and angle, so as to produce a treatment zone "Z" wherein treatment occurs without effecting the ground G, having little effect on the easily bent grasses 21 which are pushed downward out of the applicator path, but being highly effective on stiffer plants 30 to apply the chemicals directly thereto.

The traverse motion of applicator A may be accomplished by the simple addition of spacing and height controlling wheels 52 and 53 and a push handle 54 (see FIG. 5) or other simple tractive support and be thereby thrust against the vegetation while accurately spaced from the ground.

A further modification of means for carrying and regulating applicator A may be found in FIGS. 6-7-8 wherein tines 70 mounted in block 71 form a rake-like structure having its tines horizontally spaced controlled by wedges 72 mounted upon bar 72b sliding upon the tops of tines 70 and adjusted horizontally by spacing screw S1. Applicators A4 in this embodiment feed through the usual ducts by reservoir R supported upon bar 74 which is vertically adjusted by vertical adjusting screw H1 bearing upon the tops of tines 70 at cross bar 73. A suitable handle 74' permits the whole rake applicator to be drawn over the plant area and mechanical contact of the applicators with the required plants and plant zones therein may be controlled (both vertically and horizontally) with complete accuracy. Tines 70 serve the further purpose of erecting low lying plant parts for treatment when necessary.

In certain instances the condition of the plants requires that they be held up substantially without mechanical contact, except at the point of application, for correct application of selected zones, and here I prefer to use a suction device 100 connected to the usual air induction apparatus so that the air motion erects the plants, as at 120, for contact by applicators A10 as in FIG. 9.

Thus it will be seen that means have been supplied to effect my processs which includes the mechanical preparation and selection of the plants and the zones thereon to be treated through their physical characteristics and the then application of growth control chemicals with great effectiveness, little waste and controlled dosage.

Manifestly many other structures and modifications in present agricultural tools may be made to provide equivalent means of height, horizontal angle anad speed of applicator application to the plants while mechanical, electrical and chemical devices not here specifically shown are well within the skill of the modern agricultural engineer and artisan and thus within the scope of the appended claims.

I claim:
1. In a plant chemical applicator having mechanically selective chemical feeding means as a part thereof, a mounting member, adjustably spaced plant separators mounted in said member, vertically adjustable plant abraders arranged ahead of chemical applicators also attached to said mounting member, pre-setting adjustments for said separators, abraders and applicators, and a chemical supply means also supported by said mounting member and feeding said applicators, said elements in combination with each other and with means to move the whole over a ground area.

2. In a selective plant growth control chemical feeding device for mass planting areas, a carrier, growth erection elements, growth abrasion means, and a chemical applicator, said carrier supporting and carrying the other said means at predetermined heights above the area, said growth erection elements transported by said carrier and engaging the plant mass to erect the same, said abrasion means held by said carrier to engage the erected foliage, abrade the surfaces thereof at the predetermined height and feed the abraded surfaces to the chemical applicator so that the plant growth control chemicals are applied immediately to the exposed surfaces before abrasion shock in the plant substance ends and bleeding of the plant fluids begins.

3. The device of claim 2 wherein the growth erector and abrasion means are combined in a single element.

4. The device of claim 2 wherein the growth erector, abrasion and chemical applicator are embodied in a single part.

5. In massed plant growth chemical feeding tools, a plant rake and abrading structure having and supporting chemical applicator means immediately adjacent raking and abrading surfaces thereof whereby the plants are raked and chemical applied to the raked and abraded surfaces without significant interval lapse and as part of the same operation.

6. In a massed plant growth chemical feeding device, a plant separating and abrading structure having and supporting chemical applicator means immediately adjacent separating and abrading surfaces thereof, whereby the plants are separated and chemical applied to the separated and abraded surfaces without significant interval lapse and as part of the same operation.

References Cited in the file of this patent

UNITED STATES PATENTS

| | | |
|---|---|---|
| 1,156,622 | Oldham | Oct. 12, 1915 |
| 1,769,038 | Ronning | July 1, 1930 |
| 2,647,794 | Mueller | Aug. 4, 1953 |
| 2,682,132 | Marihart | June 29, 1954 |

FOREIGN PATENTS

| | | |
|---|---|---|
| 10,207 | Australia | of 1907 |
| 23,902 | Australia | of 1925 |
| 114,164 | Australia | Nov. 13, 1941 |
| 494,341 | Germany | Mar. 22, 1930 |